US007145913B2

(12) United States Patent
Craig et al.

(10) Patent No.: US 7,145,913 B2
(45) Date of Patent: Dec. 5, 2006

(54) THREAD BASED SCALABLE ROUTING FOR AN ACTIVE ROUTER

(75) Inventors: David Craig, San Jose, CA (US);
Hwangnam Kim, San Jose, CA (US);
Sungwon Ha, San Jose, CA (US);
Sung-wook Han, San Jose, CA (US);
Constantine Polychronopoulos, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 1037 days.

(21) Appl. No.: 10/076,203

(22) Filed: Feb. 13, 2002

(65) Prior Publication Data

US 2002/0114338 A1 Aug. 22, 2002

Related U.S. Application Data

(60) Provisional application No. 60/269,149, filed on Feb. 15, 2001.

(51) Int. Cl.
*H04L 12/28* (2006.01)

(52) U.S. Cl. .................. 370/401; 370/389; 718/102

(58) Field of Classification Search .............. None
See application file for complete search history.

(56) References Cited

U.S. PATENT DOCUMENTS

| | | | |
|---|---|---|---|
| 5,872,963 A | | 2/1999 | Bitar et al. |
| 6,005,860 A * | | 12/1999 | Anderson et al. ............ 370/352 |
| 6,389,449 B1 * | | 5/2002 | Nemirovsky et al. ........ 718/108 |
| 6,427,161 B1 * | | 7/2002 | LiVecchi ..................... 718/102 |
| 6,477,562 B1 * | | 11/2002 | Nemirovsky et al. ........ 718/108 |
| 6,738,846 B1 * | | 5/2004 | Slaughter et al. ............ 710/260 |
| 6,799,317 B1 * | | 9/2004 | Heywood et al. ............ 719/313 |
| 6,832,265 B1 * | | 12/2004 | Ma et al. ..................... 709/250 |
| 6,910,133 B1 * | | 6/2005 | Cohn ........................... 713/190 |

OTHER PUBLICATIONS

M.M. Michael, M.L. Scott, "Relative Performance of Preemption-Safe Locking and Non-Blocking Synchronization on Multiprogrammed Shared Memory Multiprocessors", 11th IEEE International Parallel Processing Symposium, Apr. 1997, pp. 267-273.

(Continued)

*Primary Examiner*—Bob A. Phunkulh
(74) *Attorney, Agent, or Firm*—Greer, Burns & Crain, Ltd.

(57) ABSTRACT

In the present scalable system routing method, received packets are associating with threads for processing the received packets. While a previously received packet is being processed, arrival of an interrupt is checked. If there is an interrupt, a thread is created associating the interrupt is created. Then, a determination of whether the thread associated with the interrupt has a priority that is higher than the priority of a thread associated with the previously received packet is made. If the thread associated with the interrupt has a higher priority than the previously received packet, the thread associated with the previously received packet is saved in a Shared Arena storage area. However, if the thread associated with the interrupt does not have a higher priority than the previously received packet, the thread associated with the interrupt is queued. Because threads are attached to the packets, the threads can now be suspended and resumed without having to disable interrupts, which includes periods during a context switch. As a result, a more flexible and efficient scheduling routing method can be implemented.

18 Claims, 8 Drawing Sheets

OTHER PUBLICATIONS

M.M. Michael, M.L. Scott, "Simple, Fast, and Practical Non-Blocking and Blocking Concurrent Queue Algorithms", 15th Annual ACM Symposium on Principles of Distributed Computing, May 1996, pp. 267-275.

G.C. Hunt, M.M. Michael, S. Parthasarathy, M.L. Scott, "An Efficient Algorithm for Concurrent Priority Queue Heaps", Information Processing Letters, vol. 60, No. 3, Nov. 1996, pp. 151-157.

M.M. Michael, M.L. Scott, "Implementation of Atomic Primitives on Distributed Shared Memory Multiprocessors", The First IEEE International symposium on High Performance Computer Architecture, Jan. 1995, pp. 222-231.

M.M. Michael, M.L. Scott, "Nonblocking Algorithms and Preemption-Safe Locking on Multiprogrammed Shared Memory Multiprocessors", Journal of Parallel and Distributed Computing, vol. 51, No. 1, May 1998, pp. 1-26.

* cited by examiner

THREAD BASED SCALABLE ROUTING FOR AN ACTIVE ROUTER

RELATED APPLICATIONS AND PRIORITY CLAIM

This application is related to prior provisional application No. 60/269,149, and filed Feb. 15, 2001. Applicants claim priority under 35 U.S.C. §119 from that related application.

FIELD OF THE INVENTION

The present invention generally concerns data communications. The method of the invention more specifically concerns active routers.

BACKGROUND OF THE INVENTION

Active networks offer the promise to improve bandwidth utilization compared to conventional packet routers, and active routers used in these active networks can be programmed on a per connection or even a per packet basis. This programmability makes the routers very flexible, because they are capable of allocating their finite bandwidth and processing in an application specific manner. New software applications, which contain protocols developed after a router is deployed, are able to inject a code for implementing a bandwidth allocation policy that is best suited for traffic into the network.

Others have investigated providing programmable services with Fast Ethernet line speeds that implement the NodeOS interface having an active router for programmable execution environments. Generally, the paradigm shift is a goal to route traffic produced at IEEE 802.3z (gigabit) line speeds with remotely injected services. However, there are some tradeoffs, such as flexibility and performance, in the prior methods. For example, a programmable router, such as Cisco's 7500 line of routers with VIP-4 line cards, offers such routing capacity. Although the line speeds are similar in Cisco's routers, the VIP-4 processors are not capable of accepting and then executing remotely injected code while the router continues to operate.

The flexibility versus performance tradeoffs necessarily favor a more efficient, multiprocessing execution environment. A giga-bit line speed leaves a window of approximately 8K instructions to process 1 KB packets on a utilized, dual-issue 500 Mhz processor. The ability to efficiently change resource scheduling is also a great concern, since a 1 KB packet arrives every 7.6 µs, and may require preempting the packet currently being processed. These tradeoffs between limiting the amount of processing per packet and the amount of state (e.g., the amount of data being kept track of per connection basis) the router is expected to maintain without significantly compromising observed router flexibility are difficult to balance.

Accordingly, there is a need for an improved scalable system routing method for a gigabit active router, which accounts for the aforementioned difficulties. There is a further need for an improved routing method, which reduces system overhead, making it possible to process the packets produced by gigabit networks.

SUMMARY OF THE INVENTION

These and other needs are met or exceeded by the present scalable system routing method. Received packets are associating with threads for processing the received packets, and while processing a previously received packet, the arrival of an interrupt is checked. If there is an interrupt, a thread is created associating the interrupt is created. Then, a determination of whether the thread associated with the interrupt has a priority that is higher than the priority of a thread associated with the previously received packet is made. If the thread associated with the interrupt has a higher priority than the previously received packet, the thread associated with the previously received packet is saved in a Shared Arena storage area. However, if the thread associated with the interrupt does not have a higher priority than the previously received packet, the thread associated with the interrupt is queued. Because threads are associated with the packets, the threads themselves can now be suspended and resumed without having to disable interrupts, which includes periods during a context switch. As a result, a more flexible and efficient scheduling routing method can be implemented.

DETAILED DESCRIPTION OF THE INVENTION

In the present scalable system routing method, received packets are associating with threads for processing the received packets. While a previously received packet is processing, the arrival of an interrupt is checked. If there is an interrupt, a thread is created associating the interrupt is created. Then, a determination of whether the thread associated with the interrupt has a priority that is higher than the priority of a thread associated with the previously received packet is made. If the thread associated with the interrupt has a higher priority than the previously received packet, the thread associated with the previously received packet is saved in a Shared Arena storage area. However, if the thread associated with the interrupt does not have a higher priority than the previously received packet, the thread associated with the interrupt is queued. Because threads are associated with the packets, the threads can now be suspended and resumed without having to disable interrupts, which includes periods during a context switch. As a result, a more flexible and efficient scheduling routing method can be implemented.

Preferred Infrastructure of the Present Invention

Figure 1:
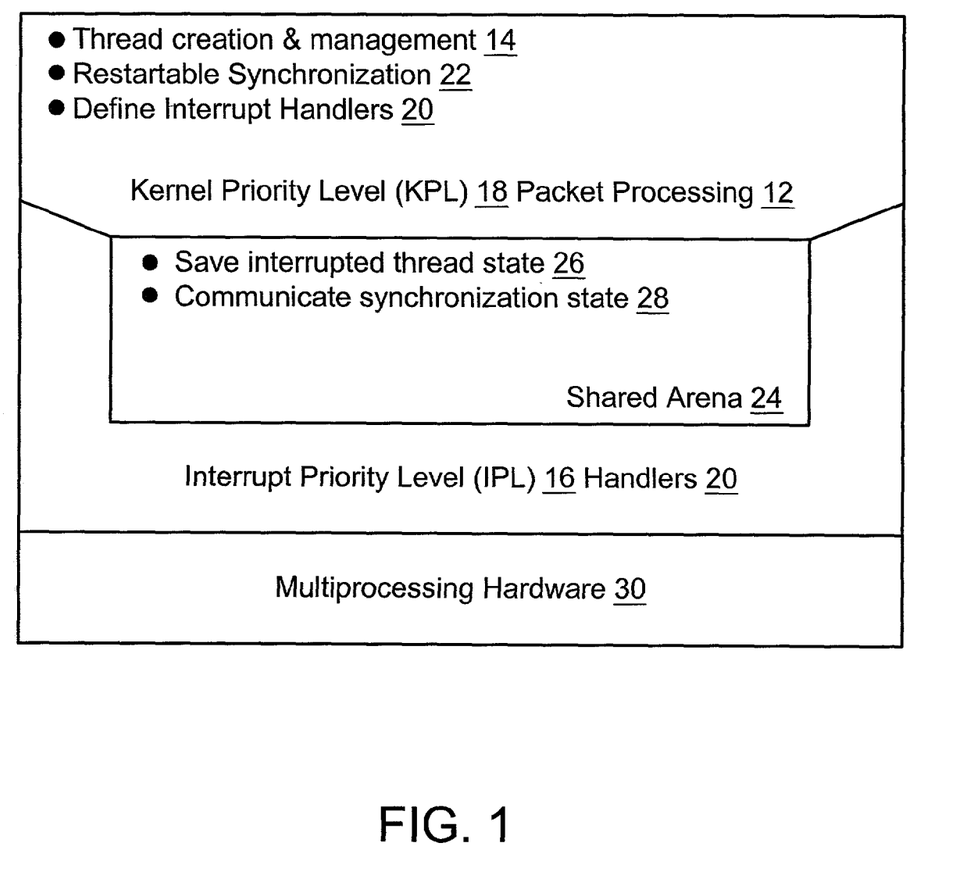
FIG. 1 illustrates a preferred overall schematic diagram of the present invention.

The preferred overall schematic diagram of the present invention is shown in FIG. 1, and indicated generally at 10.

In the present invention, a packet process 12 is configured to create a thread for each received packet or a group of received packets, which is then managed and routed to the resources according to their priority 14. Because thread creation is sufficiently inexpensive, combining a thread with the processing of each packet is very practical and is preferred. In addition, by creating a thread for each packet, the scheduling of packet processing is now simplified to the scheduling of threads to the processing resources. Thus, the problem of the router providing programmable functionality and routing without specialized hardware is achieved by the present invention. The allocation of buffer memory is also simplified with the use of threads. Thus, the creation of threads for every packet is an important aspect of the preferred embodiment.

A preferred embodiment assumes a Linux implementation, using kernel threads. In the preferred embodiment, with the creation of kernel threads for every received packets the overall structure of the present active router is preferably organized into two layers, specially an interrupt priority level ("IPL") 16 and a kernel priority level ("KPL") 18, for routing the kernel threads. The packet processing 12 is preferably handled at the kernel priority level 18. The packet process is implemented for creating the kernel threads for the received packets, which is then routed to a plurality of resources. However, when an interrupt is received at the KPL, the packet process also defines the interrupt handlers 20 for handling the interrupt. The interrupt handlers 20 are then executed at the IPL 16. If there is a resume action from the IPL 16, a restartable synchronization 22 of the thread would be handled at the KPL.

However, the present router would not queue or discard a packet interrupt when it is in the process of providing fairness by switching from one thread packet processing to another. Unlike the normal operating systems, which have to protect context switching by disabling interrupts, a Shared Arena 24 is used instead for communication between the two layers 16, 18. In order to use the Shared Arena 24, the interrupt handlers 20 are modified to do interrupt preemptions rather than saves. The difference is in saving the processor's state (e.g., data kept inside the Central Processing Unit) for the interrupted packet processing in the globally accessible Shared Arena, instead of a normal kernel thread private save area in a typical router. In other words, the interrupted thread state is saved 26 in the Shared Arena 24. As a result, the Shared Arena 24 is a communication mechanism that helps to reduce system overhead in taking interrupts, which can eliminate the need to disable interrupts. This preemption makes the interrupted packet processing state restartable by the kernel scheduler on a different processor, and the Shared Arena 24 communicate the synchronization state 28 to the KPL, which executes the restartable synchronization 22. Thus, as shown in FIG. 1, the invention is preferably implemented on a multiprocessing hardware 30. However, since the router is now preempted by an interrupt, rather than disabling the interrupt, the operations (e.g., kernel thread resume, save, and critical data structures like the run queue) must be made preemption safe.

Preemption Safe Interrupt Handler

Figure 2:
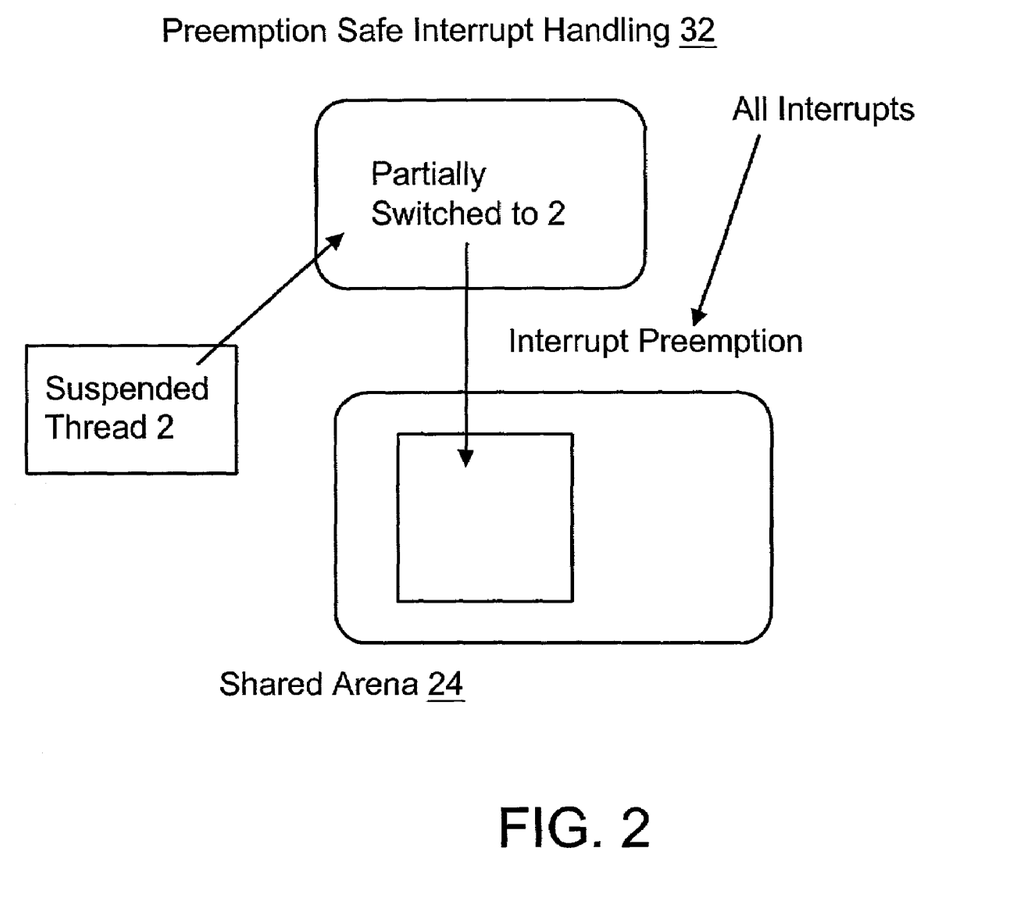
FIG. 2 illustrates a preferred preemption safe interrupt handler shown in FIG. 1.

A preferred preemption safe interrupt handler is shown in FIG. 2, and generally indicated 32. An operation that is preemption safe can be preempted at any time during its operation and be resumed without corrupting the operation. However, the procedures that reload the preempted processor state must be made such that it is restartable, since the procedures too can be preempted. A complete router based on these operations will improve the handling of high interrupt (bandwidth) rates. Since the interrupt handlers 20 in the present invention do not block kernel synchronization, system efficiency does not degrade. The preemption safe system services will further improve system efficiency by eliminating the need to disable and reenable interrupts in order to execute these services. Optimizing these services is essential for good routing performance because the router makes more use of system scheduling by using suspend and resume to maintain fair packet processing allocation when there is enough packets (threads) to consider.

In addition, since the Shared Arena 24 is accessible in both the KPL mode 18 and the IPL mode 16, the Shared Arena is not memory that can be swapped. At the lowest level, there are IPL routines that are invoked directly by the hardware for external events, such as a timer expiring or a packet arriving from the network. Typically, an interrupt handler 20 saves the interrupted kernel thread's 14 context on its kernel stack. The handler 20 then starts executing the service routine, borrowing some of the interrupted kernel thread's stack. Then, during the servicing of the interrupt, further interrupts of that type are disabled to prevent stack corruption, overruns, or clobbering the saved state. However, in the present invention, the interrupt handler is modified to perform an interruptible context switch between the thread 2 that was previously running and an interrupt service thread.

When there is an interrupt preemption (i.e., interrupt kernel thread), thread 2 is first suspended and partially switched. A partial switch is preferably performed in order to avoid full thread state being saved to or reloaded from the Shared Arena. After thread 2 has been partially switched, the interrupt is handled. After the interrupt is complete, thread 2 is only partially resumed, or it is completely saved and a higher priority kernel thread is resumed. As a result, this save allows the kernel to restart interrupted threads without expecting the interrupted kernel thread to first voluntarily yield the resource as it does in the prior art, such as the Linux operating system. However, this functionality requires a redesign of how and where threads are context switched, saved, and resumed.

Interrupt Preemptable Code

Figure 3:
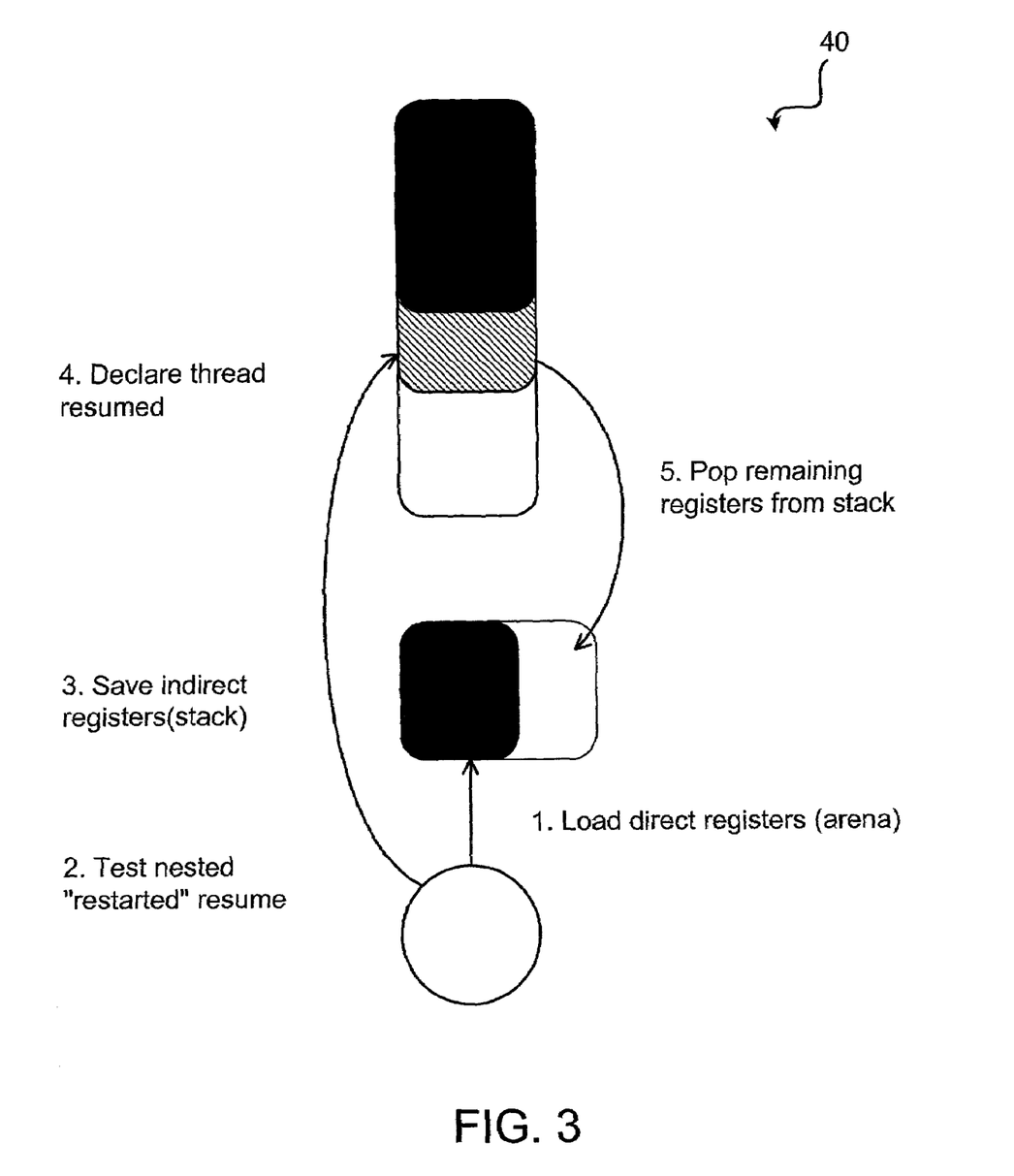
FIG. 3 illustrates a preferred interrupt preemptable code for resuming a kernel thread shown in FIG. 2.

A preferred interrupt preemptable code for resuming a kernel thread is shown in FIG. 3, and indicated generally at 40. As shown in the previous FIG. 2, the save areas in the Shared Arena are used as staging areas for the context switch. The context switch is used by another thread at KPL to resume a kernel thread preempted at IPL. The complexity is in correctly handling the race between declaring the thread as having been resumed via setting a shared variable, and an another preemption and save that could corrupt the save area. In order to avoid the save area from being corrupted, the declaration is setting the identifier of the thread that is currently being executed by a resource. This identifier must be set before the thread is completely resumed, because the context switch is completed by loading and setting the program counter to start executing the code where an interrupt asynchronously preempted the kernel thread.

In step 1, load directly settable registers (e.g., the working set/data of the thread that is currently using the processor) from the Share Arena 24, then test for a nested "restarted" resume in step 2. The next step is to save the indirect registers in the kernel stack in the Save Arena. After the indirect registers are saved, the kernel thread can be safely resumed in the process (step 4), and the process continues by popping remaining registers from the stack in Step 5. The way context switch, which is safely preempted, is described in cases for the possible orderings of the race between preemption and declaration.

First Case

The first case is preemption occurring after declaration but before the resume is complete. All of the state that has not been loaded into the processor after the declaration (at the very least the program counter) reside in a memory location that can be overwritten by another, nested invocation of preemption and resume. A nested resume occurs after another thread attempts to resume the context of a thread preempted in the last stages of resume. The nested resume is detected by doing a check of the preempted program counter in step 2. If the check returns true, the correct registers have been saved on the stack of the thread to be resumed, and thus step 3 is skipped. If the check returns false, the correct registers reside in the save area in the Shared Arena. Since it is possible to determine the location of the correct register contents after IPL preemption, it is not necessary to block interrupts for this case.

The Second Case

The second case is a preemption before declaration that preempts a thread in the process of yielding its scheduled resource. Conceptually, this preemption is still equivalent to preempting the yielding thread. However, the yielding thread at some previous time, acquired mutual exclusion for the resumed thread's preempted context (through clearing the context's available status in the save area). Suspending the processor at this point would hold up two threads. Either the yielding context is completely saved in the time to do a voluntary switch or an interrupt preemption. Therefore, the nonblocking property of the operating system is maintained without disabling interrupts. The remaining issue is preventing a voluntary and an interrupt preemption saving to the same memory location. A voluntary save does not save into the Shared Arena but the thread descriptor (not shared) as is normally done in multithreading systems. Instead, the voluntary save completes the necessary code paths in order to provide preemptable context switching. A faster context switch increases the rate at which the OS is able to produce simultaneous access to core data structures, principally the run queue.

Interrupt Handling and Packet Processing

Figure 4:
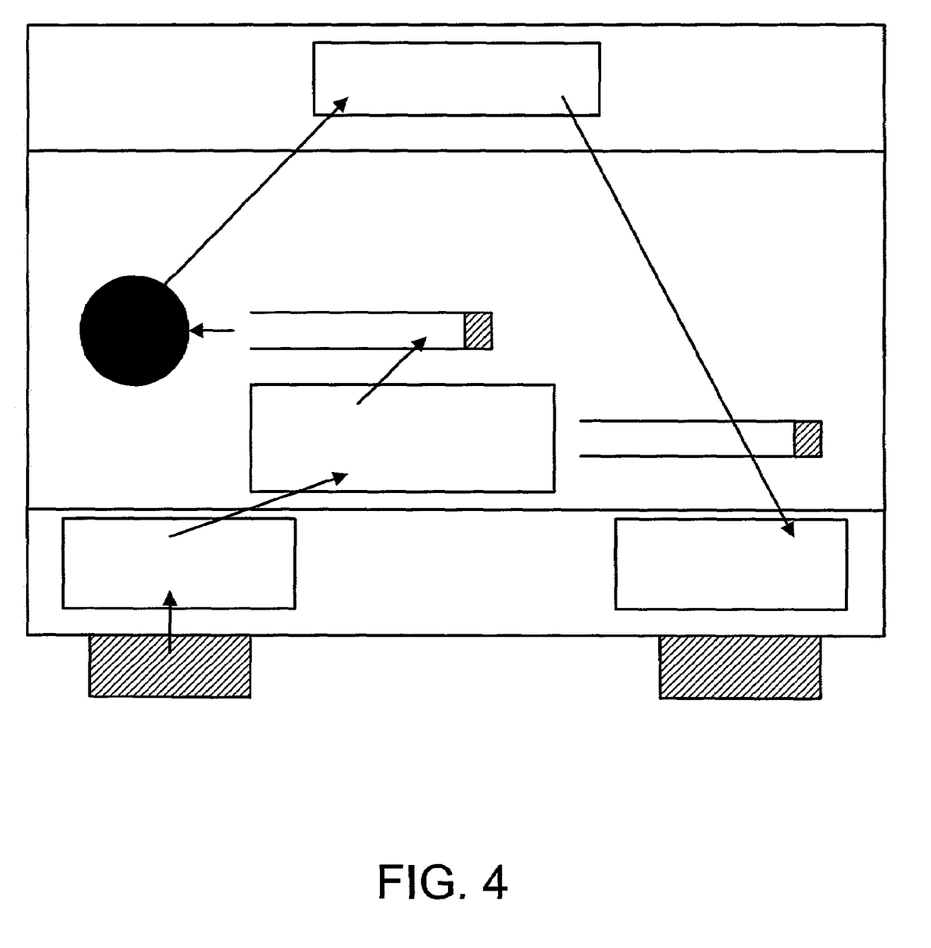
FIG. 4 illustrates an overall schematic diagram of the interrupt handling and the packet processing shown in FIG. 1.

An overall schematic diagram of the interrupt handling and the packet processing is shown in FIG. 4. In the present invention, the storage for the packet is allocated on the stack of a kernel thread. Because thread creation is sufficiently inexpensive, combining a thread with the processing of each packet is practical. However, by creating a thread for each packet, the scheduling of packet processing is now simplified to the scheduling of threads to the processing resources. Thus, the problem of the OS providing direct support, without specialized hardware operations to change the packet a processor is handling, is achieved by the present invention. In addition, the allocation of buffer memory is also simplified.

Since the thread descriptor, packet buffer, and thread stack are allocated as a single object, the interrupt service routine (ISR) is completed by enqueueing the packet thread to the system run queue. In contrast, direct access to the run queue from ISR is generally prevented by the run queue's lock in the OS (e.g., Linux). Once a processing resource becomes available due to a priority change or a thread exiting, the scheduler starts the thread executing. Since packet processing is not atomic (i.e., preemptable), low overhead to multiplex the processing of packets on the CPUs for fairness is, thus, allowed. When the thread completes the service initialized to carry out, it enqueues the packet for hard transmit by an output scheduler thread as is the case in Linux. However, unlike in Linux, the output queue can be dynamically varied in length and does not require a lock to protect parallel access. Parallel access on the key data structures that are in the critical path of a packet's trip can help improve the router's utilization of additional routing processors. The combination of preemptable system services and parallel access data structures provide the scalability in the present invention.

Nonblocking Priority Scheduling

Figure 5:
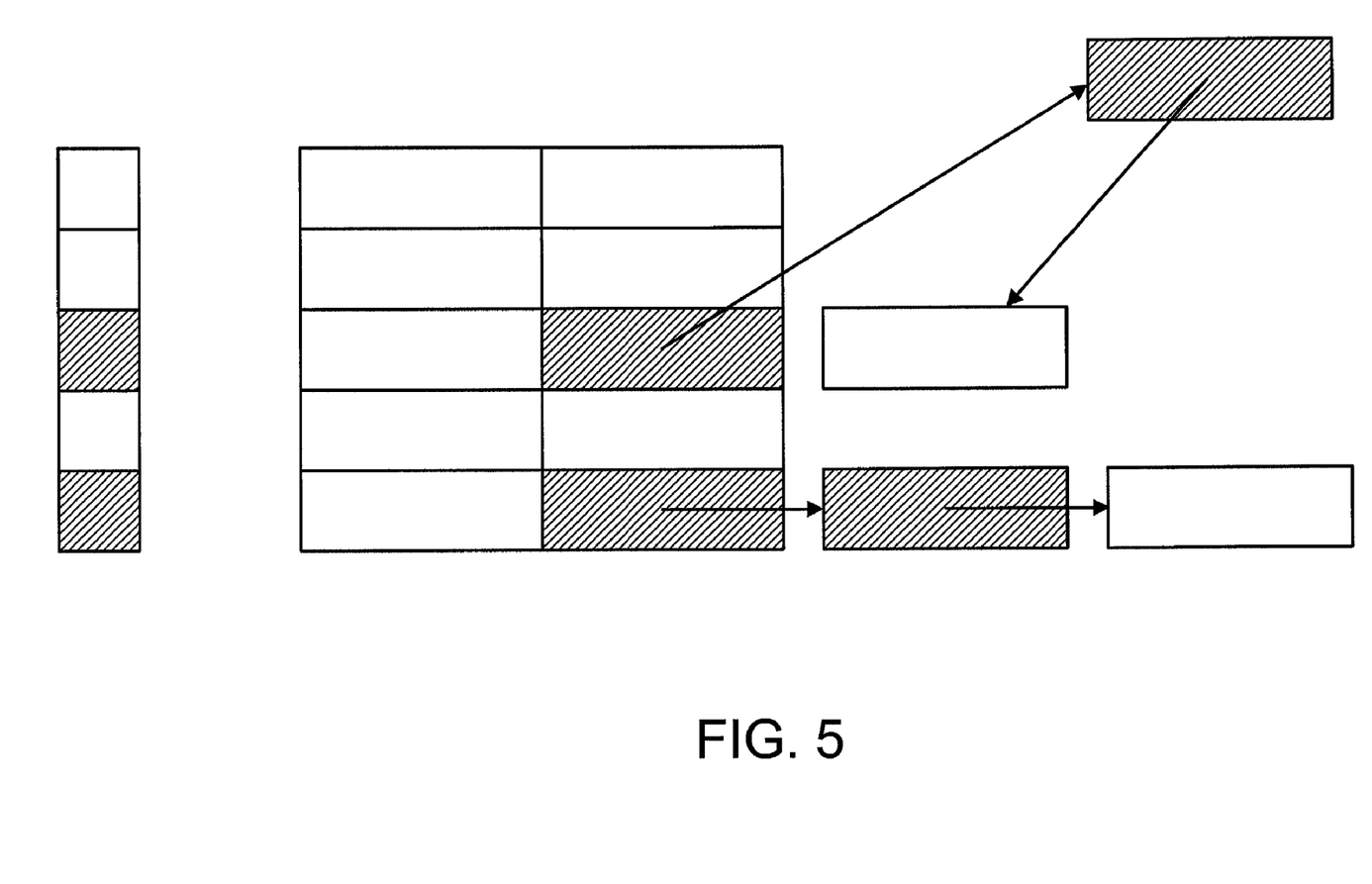
FIG. 5 illustrates a preferred nonblocking priority-based run queue.

A preferred nonblocking priority-based run queue implemented with the present invention is shown in FIG. 5. The run queue is accessible for simultaneous parallel accesses by pushing the necessary synchronization into hardware supported atomic operations, including Fetch&Add, Fetch&Swap, Compare&Swap. This technique also makes the run queue accessible to interrupt service routines to make threads runnable without explicitly addressing priority inversion. In open source operating systems (e.g., Linux) and commercial operating systems (e.g., IRIX), a thread lock and a queue lock are implemented to protect the run queue and context switch, respectively. Introducing a parallel access queue would be of questionable use in these operating systems, because locking and its overhead are still required for the context switch. The context switch could race with simultaneous scheduler operations, such as suspend and resume, making a lock to protect thread state necessary. Moreover, a parallel access run queue is less functional than its locked counterpart, since it is unable to service requests for searches and modifications on a snapshot of the run queue. It is assumed that these reasons combined with the complexity of creating a nonblocking operating system have prevented their incorporation in the scheduling core of mainstream operating systems. However, there is a need for handling a faster rate of resource allocation changes than the time slice of these operating systems (e.g., 10 µs to 100 µs). There is a possibility that a higher priority packet will arrive at a line card's streaming rate (7.6 µs 1K packets and faster for smaller packets). As a result, the need for preemptive priorities precludes most existing nonblocking data structures.

However, as shown in FIG. 5, a priority bit vector is provided in a run queue of the present invention that includes an array of nonblocking Last-In-First-Out ("LIFO") or First-In-First-Out ("FIFO") data structures. The Top of Stack ("TOS") is used by a nonblocking LIFO that updates an "Age value" and a TOS pointer with an atomic operation to add or remove a thread. The "Age value" prevents a preempted thread from corrupting the queue, since it stores values read from the queue for a long period of time. However, the queue could be corrupted by a dequeue, if only the TOS value and next pointer were read before preemption. Thus, during preemption, the stack is modified, but the TOS value happens to equal the previously read value when the dequeue is restarted. The dequeue would atomically swap the previously read TOS value with the wrong next pointer. As a result, the "Age value" substantially reduces the likelihood of this occurrence.

Existing nonblocking LIFO and FIFO algorithms are modified to indicate at their completion whether a dequeue removed the last entry in a priority or an enqueue added to a previously empty priority. These are the only two cases that atomically invert a bit corresponding to the priority emptied or newly populated, respectively. A single load of this bit vector is used by dequeuers to locate the queues containing threads. Therefore, enqueue and dequeue operations normally consume the overhead of a single atomic operation on a loaded system. The sole caveat is in the unloaded state. If a thread is preempted before completing the atomic update to the priority bit vector, dequeue attempts can be directed to an empty priority or a priority with runnable threads, which will be hidden from dequeue attempts. The first case has to be provided for in the dequeue algorithm. Simultaneous dequeue attempts can be directed to the same priority. One of the dequeuers masks its local copy of the priority bit vector after it determined that the priority is really empty. The second case can only be corrected by periodically sweeping for hidden threads.

Kernel Router Operating System Organization

Figure 6:
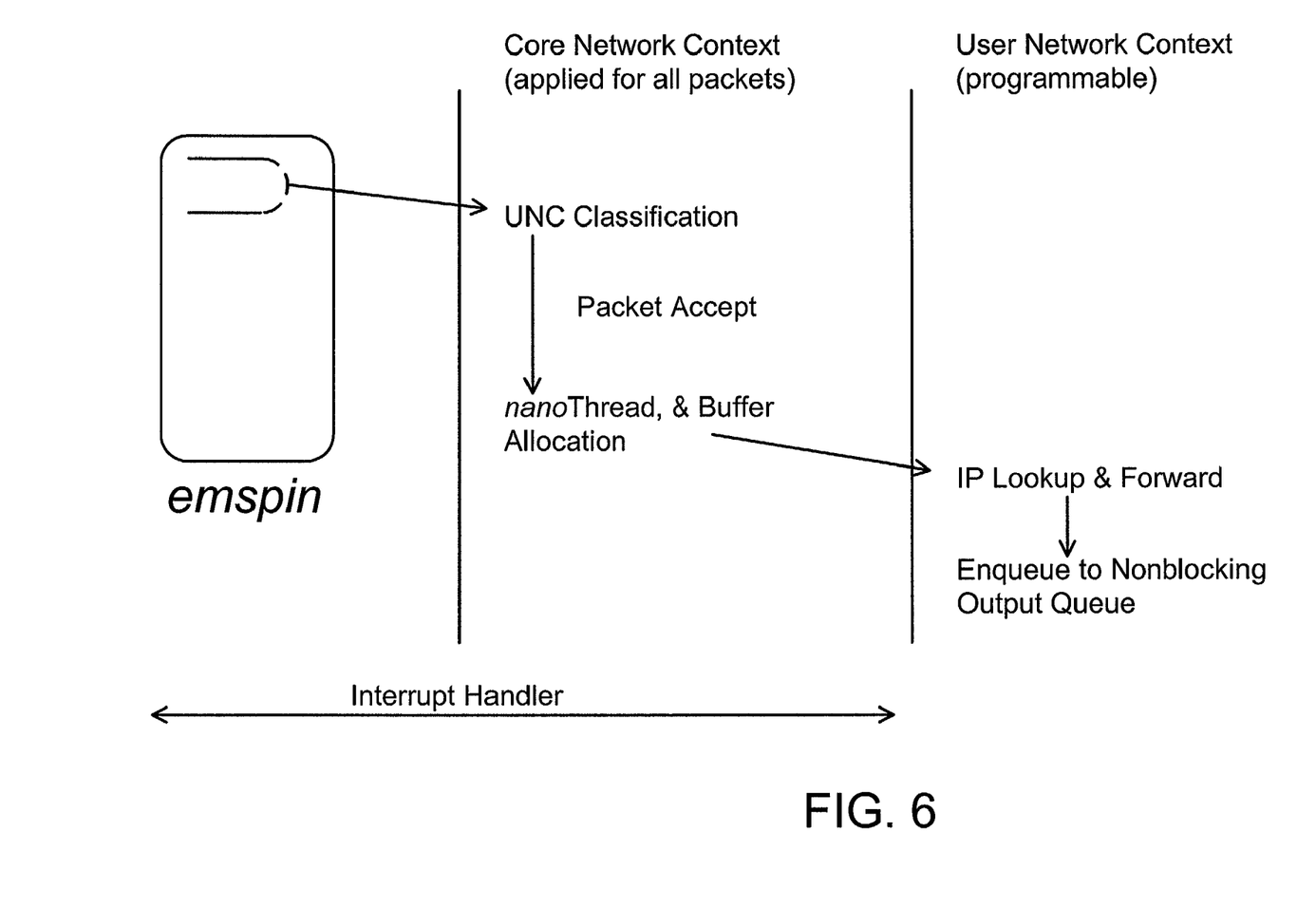
FIG. 6 illustrates an overall diagram of the organization of the kernel router operating system.

An overall diagram of the organization of the kernel router operating system is shown in FIG. 6. More specifically, the preferred entry path of the packets through the operating system is shown. The ideal case that is available in some commodity hardware gigabit ethernet cards is illustrated. Performing classification on a packet before buffer allocation presumes that a packet's header can be efficiently sent before the driver requests that the packet's data be copied. By placing a classification directly in the interrupt handler, the earliest opportunity to determine whether a packet should be selectively denied is provided in the system. The preferred table used in this stage is smaller and faster than the normal IP lookup table, it is assumed the router services can be applied on logical groupings of connections rather than individual the source, destination, and TOS fields.

The kernel thread stack, descriptor, and packet-buffer (1500 bytes MTU) are stored in a single page of memory (4 k). Thread allocation uses a private pool of threads reserved for the router, so reinitialization for each thread is minimal (i.e. the descriptor of a recently deceased packet processing thread requires very few updates to safely make it runnable). After the packet is copied to the buffer, the thread is added to the global run queue. The processors, then, poll the run queue for new threads after a thread exits, a contended synchronization operation, a timer interrupt event, or constantly by the lowest priority idle thread. The packet processing thread is initialized to start executing at the address for the packet processing routine. The packet processes to termination unless it voluntarily yields the resource. Once packet processing is completed, it is scheduled for an output interface through a nonblocking output queue.

The nonblocking output buffer is similar in design, which includes a hybrid private and parallel access run queue. Since hardware supported atomic operations are more time costly, they should be avoided unless contention mandates their use. The output queue is optimized for parallel enqueue from threads submitting completed packets. The timer interrupt only occurs on one CPU because a single thread is used to service the timer interrupt. This optimization enables the use of normal operations, rather than atomic operations to dequeue the packets. However, parallel dequeue is not as useful because the system bus serializes their transmission to the transmission buffer.

An Execution Model for a Scalable Router

Figure 7:
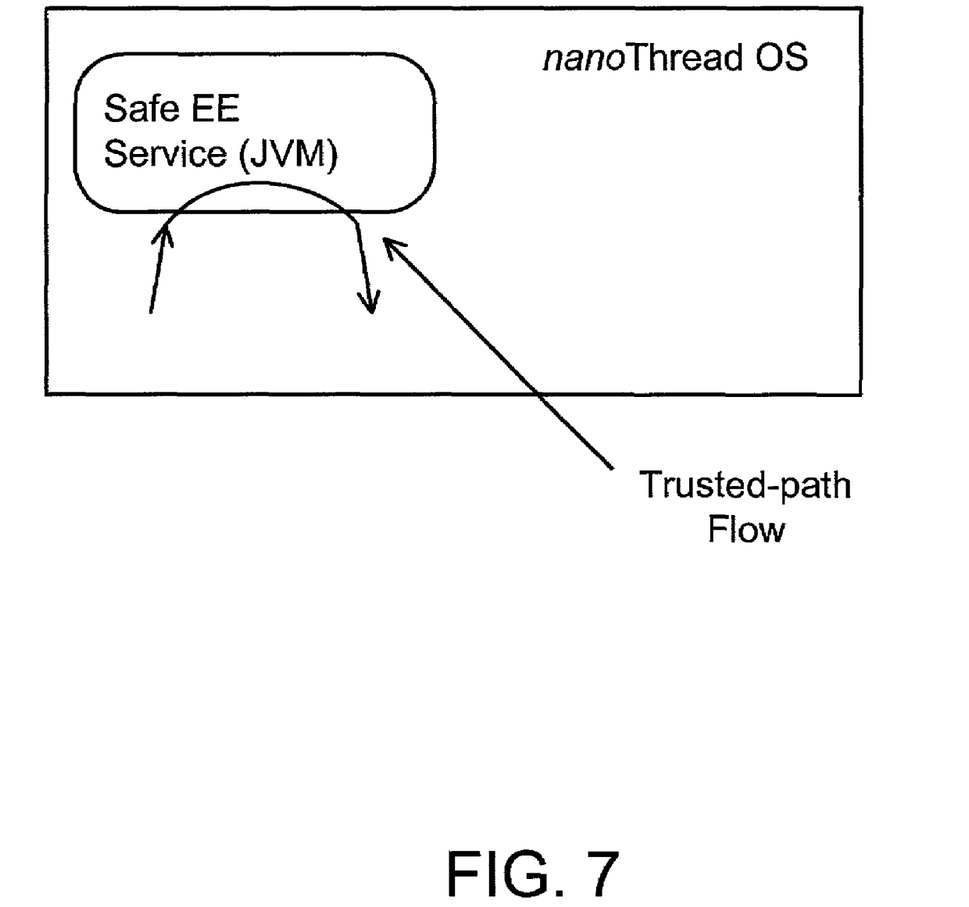
FIG. 7 illustrates an unified kernel path implemented with the present invention is shown in FIG. 7; and, FIG. 8 illustrates a preferred commodity hardware architecture in which the present invention can be implemented is shown in FIG. 8.

An unified kernel path implemented with the present invention is shown in FIG. 7. In the present invention, the programmability is preferably moved down to the level of a trusted path within the kernel. In particular, this is the level at which the Core Network Context (CNC) and User Network Contexts (UNCS) hierarchy are implemented from the Protean architecture invented by R. Sivakurnar, S. Han, and V. Bharghavan disclosed in an article entitled, "A scalable architecture for active networks," published in OpenArch, 2000. The trusted path first executes CNC services that provide the policies applied to all traffic through the router. These policies, in turn, provide fair allocation of output bandwidth and processing capacity. The CNC manages a predefined number of UNCS, so the overhead of providing fairness and scheduling is reduced in operations like classifying amongst a limited number of UNCS. UNCs are an abstraction for differentiating services based on routing source, destination, and type of service. The logical grouping of connection types into UNCs places a tractable limit on the amount of state maintained in the router. This architecture has demonstrated the benefit of providing programmable services comparable to more flexible active network designs.

The trusted path can provide a way to remotely inject into a router both programmable services and execution environments for untrusted services. Some execution environments, such as the Java interpreter for ANTS, require direct access to system services such as thread management. Since services are executed directly in the kernel, an execution environment for untrusted services can be accomplished without significant overhead.

Commodity Hardware Architecture

Figure 8:
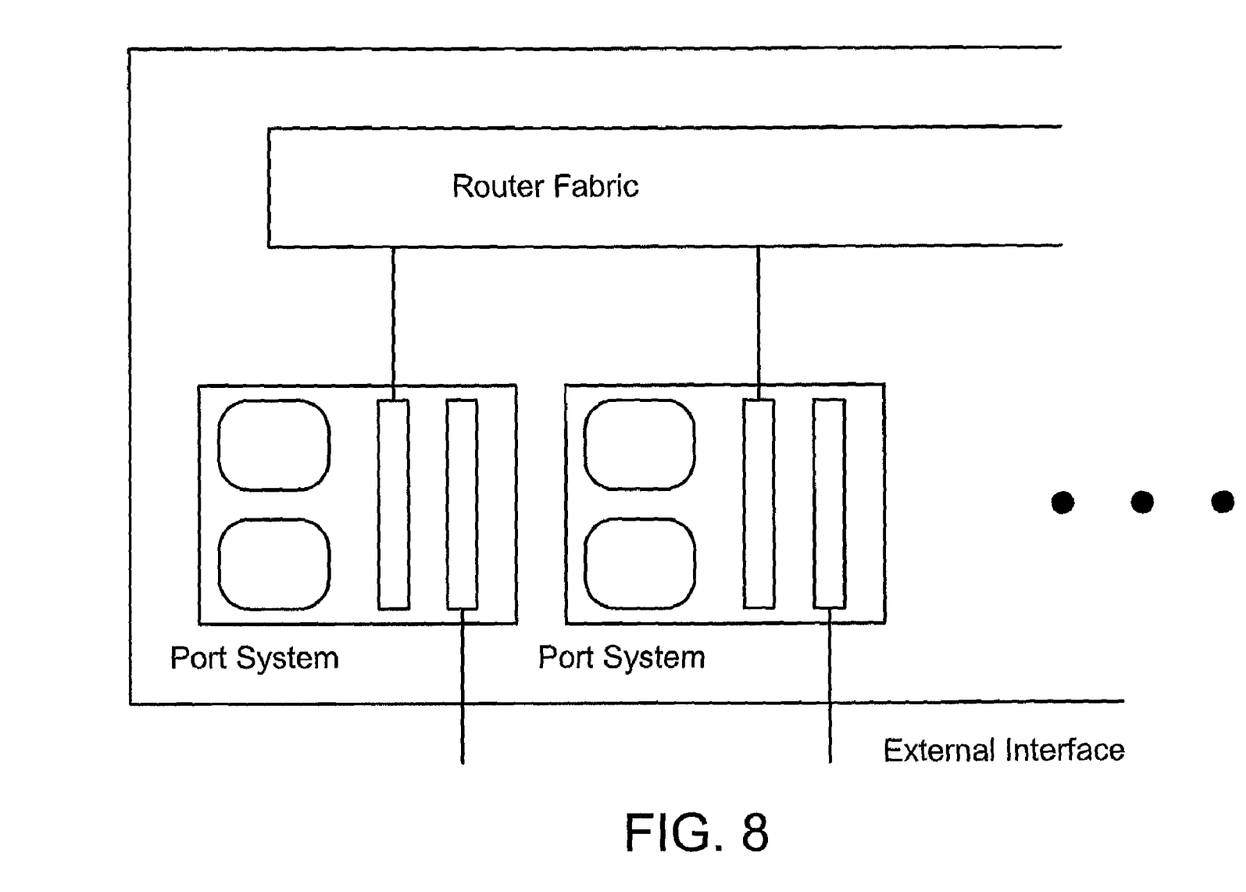

A preferred commodity hardware architecture in which the present invention can be implemented is shown in FIG. 8. The preferred hardware is a two stage architecture. The lower tier is composed of commodity PIII 550 Mhz systems (not shown) that act as the router's workhorse. This is where the routing operations for an input packet are executed. The theoretical capacity of the processors at these nodes is 17.6 cycles per word produced by the external gigabit ethernet interface. It is necessary to attain more processing capacity, since the real capacity is far lower due to memory and bus overheads. It is less expensive to add processing capacity with a second processor than increasing the processor speed. In practice, it is expected that the capacity will be roughly doubled without static partitioning. The design of the present invention helps to remove the Operating System as a scaling bottleneck and provides scalable system services for downloaded drivers.

Once processed control information is appended to the packet for routing within the router architecture, there may still be queueing issues between the programmable nodes of the router. Thus, the output packet scheduler implements guarantees for Quality of Service ("QoS") and rate control on forwarding packets within the router. Although the design shown is limited to controlling bandwidth, the present invention can be extended to handle other controls, such as latency and jitter. As a result, these various other implementations are contemplated and are within the scope of the present invention. Another enhancement considered is internal support for multicast to the routing nodes. One of the goals of the present invention is to provide gigabit routing services at the lower tier with inexpensive multiprocessors and one external and one internal gigabit interface. In the upper tier, a commodity gigabit switch acts as a low latency router fabric, connecting the lower tier.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method usable in an active router to route received packets, said method comprising the steps of:
   associating threads with received packets for processing the received packets; and
   while processing a previously received packet,
   checking for the arrival of an interrupt;
   creating a thread for associating said interrupt;
   determining whether the thread associated with the interrupt has a priority that is higher than the priority of a thread associated with said previously received packet;
   if the thread associated with the interrupt has a higher priority than said previously received packet, saving the thread associated with the previously received packet in a Shared Arena storage area;
   if the thread associated with the interrupt does not have a higher priority than said previously received packet, queuing the thread associated with the interrupt.

2. The method according to claim 1, wherein the interrupt is an event indicating the arrival of a packet or expiration of a timer.

3. The method according to claim 1, wherein a thread is associated with each received packet or a group of received packets.

4. The method according to claim 1 further comprising a step of processing said thread associated with the interrupt, wherein the Shared Arena is accessible during said step of processing a previously received packet, said step of determining whether the thread associated with the interrupt has a priority that is higher than the priority of a thread associated with said previously received packet, and said step of processing said thread associated with the interrupt.

5. The method according to claim 1, wherein the thread associated with the previously received packet saved in the Shared Arena is preempted by the interrupt having a higher priority, and the processing of the received packet is suspended in the Shared Arena.

6. The method according to claim 1 further comprising the step of processing the interrupt.

7. The method according to claim 6, wherein during said step of processing of the interrupt, further interrupts of lower or equal priority are disabled.

8. The method according to claim 6, wherein when said step of processing of the interrupt has ended, the method further comprises the steps of:
   determining whether there is a pending interrupt or thread having a higher priority than the thread saved in the Shared Arena;
   if there is a pending interrupt or thread having a higher priority than the thread saved in the Shared Arena, processing the next interrupt or thread; and,
   if there is no next interrupt or thread having a higher priority, resuming the processing of the thread associated with the previously received packet saved in the Shared Arena.

9. The method according to claim 8, wherein prior to resuming the processing of the thread, the method further comprises the step of setting an identifier of a currently running thread.

10. The method according to claim 1, wherein said step of associating threads with received packets further comprises the step of enqueueing said threads to a nonblocking priority run queue accessible for parallel access.

11. The method according to claim 10, wherein said run queue includes an age value and a pointer that are updated with an operation to either add or remove a thread from said run queue, and said age value is used only to ensure one parallel operation at a time and a pointer indicating either an adding or removing of a thread.

12. The method according to claim 10, wherein said run queue is an array of nonblocking Last-In-First-Out ("LIFO") or First-In-First-Out ("FIFO") data structures.

13. A system usable in an active router to route received packets comprising of:
   a packet priority level process scheduling threads and processing and routing the packets according to their priority;
   an interrupt priority handling process for handling an interrupt and associating threads with received packets and scheduling said packets during a processing of a previously received packet associated to a thread; and,
   a Shared Arena for storing the thread associated with the previously received packet before the processing of the interrupt;
   wherein said Shared Arena is a communication mechanism between said packet priority level packet process and said interrupt priority handling process.

14. The system as defined in claim 13 further comprising a nonblocking priority run queue accessible for parallel access.

15. The system as defined in claim 13, wherein the thread saved in the Shared Arena is suspended until the processing of the interrupt has ended.

16. The system as defined in claim 13, wherein the thread saved in the Shared Arena may be resumed when returning to packet priority level processing.

17. The system as defined in claim 16 further comprising a plurality of processors, and the interrupt is processed on one processor and the resumed thread is processed on another processor.

18. A router for routing received packets, said router comprising a set of instructions to:
   associating threads with received packets for processing the received packets; and
   while processing a previously received packet,
   checking for the arrival of an interrupt;
   creating a thread for associating said interrupt;
   determining whether the thread associated with the interrupt has a priority that is higher than the priority of a thread associated with said previously received packet;
   if the thread associated with the interrupt has a higher priority than said previously received packet, saving the thread associated with the previously received packet in a Shared Arena storage area;
   if the thread associated with the interrupt does not have a higher priority than said previously received packet, queuing the thread associated with the interrupt.

* * * * *